United States Patent
Bhide et al.

(10) Patent No.: US 11,797,576 B2
(45) Date of Patent: Oct. 24, 2023

(54) SENSITIVITY-BASED DATABASE PROCESSING AND DISTRIBUTED STORAGE

(71) Applicant: INTERNATIONAL BUSINESS MACHINES CORPORATION, Armonk, NY (US)

(72) Inventors: Manish Anand Bhide, Hyderabad (IN); Prateek Goyal, Indore (IN); Seema Nagar, Bangalore (IN); Sougata Mukherjea, New Delhi (IN); Kuntal Dey, Rampurhat (IN); Pramod Vadayadiyil Raveendran, Machiplavu (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/410,181

(22) Filed: Aug. 24, 2021

(65) Prior Publication Data
US 2023/0066677 A1   Mar. 2, 2023

(51) Int. Cl.
*G06F 16/28* (2019.01)
*G06F 16/22* (2019.01)
(Continued)

(52) U.S. Cl.
CPC .......... *G06F 16/284* (2019.01); *G06F 16/221* (2019.01); *G06F 16/2282* (2019.01);
(Continued)

(58) Field of Classification Search
CPC .................................................. G06F 16/284
(Continued)

(56) References Cited

U.S. PATENT DOCUMENTS 9,424,432 B2   8/2016   Holland et al.
9,460,169 B2   10/2016  Hinton et al.
(Continued)

FOREIGN PATENT DOCUMENTS

| CN | 108363717 A | * | 8/2018 | .......... G06F 16/285 |
| CN | 113468560 A | * | 10/2021 | |
| EP | 3136236 | | 3/2017 | |

OTHER PUBLICATIONS

Mell et al., "The NIST Definition of Cloud Computing", NIST, Special Publication 800-145, Sep. 2011, 7 pages.
(Continued)

*Primary Examiner* — Syling Yen
(74) *Attorney, Agent, or Firm* — Rakesh Roy; Andrew D. Wright; Calderon Safran & Cole P.C.

(57) ABSTRACT

A system and method is provided to selectively process and store tables of a relational database by calculating an overall data sensitivity score for each table based on predefined attribute rules; performing column-wise splitting of at least one of the tables into a first table and a second table based on the overall data sensitivity score of each table, thereby generating a total number of relational database tables; storing a first subset of the total number of relational database tables in a private cloud storage database in a distributed storage environment based on the overall data sensitivity scores of each of the total number of relational database tables; and storing a second subset of the total number of relational database tables in a public cloud storage database of the distributed storage environment based on the overall data sensitivity scores of each of the total number of relational database tables.

20 Claims, 7 Drawing Sheets

(51) Int. Cl.
    G06F 21/62      (2013.01)
    G06F 16/2455    (2019.01)
    G06F 16/248     (2019.01)
(52) U.S. Cl.
    CPC ...... *G06F 16/248* (2019.01); *G06F 16/24554* (2019.01); *G06F 21/6227* (2013.01)
(58) Field of Classification Search
    USPC ........................................................ 707/802
    See application file for complete search history.

(56) References Cited

U.S. PATENT DOCUMENTS

| | | | |
|---|---|---|---|
| 9,699,148 B2 | 7/2017 | Barsness et al. | |
| 2011/0016214 A1 | 1/2011 | Jackson | |
| 2013/0246810 A1 | 9/2013 | Orsini et al. | |
| 2017/0339070 A1 | 11/2017 | Chang et al. | |
| 2018/0089196 A1* | 3/2018 | Kenthapadi | G06F 21/6245 |
| 2018/0357264 A1 | 12/2018 | Rice et al. | |
| 2019/0121979 A1* | 4/2019 | Chari | G06N 20/00 |

OTHER PUBLICATIONS

Xu et al., "A Framework for Privacy-Aware Computing on Hybrid Clouds with Mixed-Sensitivity Data", Aug. 26, 2015, 6 pages.

Omran et al., "A Data Partition Based Model to Enforce Security in Cloud Database", Sep. 2014, 10 pages.

Anonymous, "A new architecture in hybird cloud to secure authorized business content",IPCOM000242936D, ip.com, Sep. 1, 2015, 10 pages.

Vulapula et al., "Query processing over secure perturbed data over hybrid cloud", Dec. 28, 2020, 2 pages.

Rajkamal et al., "Sensitive Data Identification and Protection in a Structured and Unstructured Data in Cloud Based Storage", Feb. 8, 2021, 10 pages.

Leena, "Split table—A Database Refactoring Technique", https://medium.com/continuousdelivery/split-table-a-database-refactoring-technique-5dec00449e51, Jan. 30, 2018, 4 pages.

Anonymous, "Splitting a table—SQL Prompt 10", https://documentation.red-gate.com/sp/sql-refactoring/refactoring-databases/splitting-a-table, Oct. 29, 2019, 6 pages.

Anonymous,"Normalization in DBMS: 1NF, 2NF, 3NF and BCNF in Database", accessed Jul. 26, 2021, 9 pages.

Anonymous, "Specify normalization type for sensitivity analysis", https://www.mathworks.com/help/simbio/ref/normalization.html, accessed Aug. 19, 2021, 2 pages.

Kirch, "The effect of model rescaling and normalization on sensitivity analysis on an example of a MAPK pathway model", https://link.springer.com/article/10.1140/epjnbp/s40366-016-0030-z, May 10, 2016, 61 pages.

Bakhi, "Database security in the cloud", 2012, 63 pages.

* cited by examiner

Original Table 600

| ID | Name | Age | Date of Birth | Location of birth | Address | Medical Info | Profession | Education | Term Plan | Duration |
|---|---|---|---|---|---|---|---|---|---|---|
| 1 | John | 46 | 1/1/1975 | Texas | 100 Main Rd | Blood Pressure | Teacher | secondary | Plan A | 1 Year |
| 2 | Jane | 50 | 2/2/1970 | Maine | 200 First Street | Migraine | Attorney | secondary | Plan B | 1 Year |
| .... | ... | ... | ... | ... | ... | ... | ... | ... | ... | ... |

⇩ Normalization 601 ⇩

Primary Table 602A

| ID | Name | Age | Date of Birth | Location of birth | Address | Medical Info |
|---|---|---|---|---|---|---|
| 1 | John | 46 | 1/1/1975 | Texas | 100 Main Rd | Blood Pressure |
| 2 | Jane | 50 | 2/2/1970 | Maine | 200 First Street | Migraine |
| .... | ... | ... | ... | ... | ... | ... |

Primary Table 602B

| ID | Profession | Education |
|---|---|---|
| 1 | Teacher | secondary |
| 2 | Attorney | secondary |
| .... | ... | ... |

Primary Table 602C

| ID | Term Plan | Duration |
|---|---|---|
| 1 | Plan A | 1 Year |
| 2 | Plan B | 1 Year |
| .... | ... | ... |

⇩ Sensitivity-Based Table Splitting 604 ⇩

Secondary Table 603A

| ID | Name | Age | Date of Birth | Medical Info |
|---|---|---|---|---|
| 1 | John | 46 | 1/1/1975 | Blood Pressure |
| 2 | Jane | 50 | 2/2/1970 | Migraine |
| .... | ... | ... | ... | ... |

Secondary Table 603B

| ID | Location of birth | Address |
|---|---|---|
| 1 | Texas | 100 Main Rd |
| 2 | Maine | 200 First Street |
| .... | ... | ... |

Store in Private Cloud 605

Store in Public Cloud 606

FIG. 6

SENSITIVITY-BASED DATABASE PROCESSING AND DISTRIBUTED STORAGE

BACKGROUND

Aspects of the present invention relate generally to distributed data storage and, more particularly, to sensitivity-based database processing and distributed storage.

Database normalization is a process used to structure a database, usually a relational database, in accordance with a series of so-called normal forms in order to reduce data redundancy and improve data integrity (e.g., by eliminating undesirable characteristics like Insertion, Update and Deletion Anomalies). Normalization rules may divide larger tables into smaller tables and link them using relationships. Commonly used normal forms include: a first normal form (1NF); a second normal form (2NF); a third normal form (3NF); a Boyce & Codd normal form (BCNF); and a fourth normal form (4NF).

In general, a relational database is a collection of data items with predefined relationships between them. The data items are organized as a set of tables with columns and rows, wherein the tables hold information about objects represented in the database. Each table column holds a certain kind of data and a field stores the actual value of an attribute. Attributes describe characteristics or properties that define all items pertaining to a certain category applied to all cells of a column. The rows in the table represent a collection of related values of one object or entity. Each row in a table may be marked with a unique identifier called a primary key, and rows among multiple tables can be related using foreign keys.

Relational databases may be stored as a distributed database. A distributed database is a database in which data is stored across different physical locations. In a distributed database, data may be stored in multiple computers located in the same physical location, or may be dispersed over a network of interconnected computers. One type of distributed database utilizes a hybrid cloud model, where data is stored across both private and public cloud resources.

SUMMARY

In a first aspect of the invention, there is a computer-implemented method including: calculating, by a computing device in a distributed storage environment, an overall data sensitivity score for each table of a relational database based on predefined attribute rules; performing, by the computing device, column-wise splitting of at least one of the tables of the relational database into a first table and a second table based on the overall data sensitivity score of each table of the relational database, thereby generating a total number of relational database tables; storing, by the computing device, a first subset of the total number of relational database tables in a private cloud storage database in the distributed storage environment based on the overall data sensitivity scores of each of the total number of relational database tables; and storing, by the computing device, a second subset of the total number of relational database tables in a public cloud storage database of the distributed storage environment based on the overall data sensitivity scores of each of the total number of relational database tables.

In another aspect of the invention, there is a computer program product including one or more computer readable storage media having program instructions collectively stored on the one or more computer readable storage media. The program instructions are executable to: perform data normalization of a relational database, thereby producing a number of tables of the relational database; calculate an overall sensitivity score for each of the tables of the relational database; determine whether the sensitivity score for each of the tables of the relational database meets or exceeds a table splitting threshold; split, column-wise, any table of the relational database determined to have a sensitivity score that meets or exceeds the table splitting threshold into a first table and a second table, wherein the first table and the second table each include a primary key from the table being split, thereby generating a total number of relational database tables; store a first subset of the total number of relational database tables in a private cloud storage database based on the overall data sensitivity scores of each of the total number of relational database tables; and store a second subset of the total number of relational database tables in a public cloud storage database based on the overall data sensitivity scores of each of the total number of relational database tables. In embodiments, the tables of the first subset of the total number of relational database tables have a higher overall sensitivity score than the tables of the second subset of the total number of relational database tables.

In another aspect of the invention, there is system including a processor, a computer readable memory, one or more computer readable storage media, and program instructions collectively stored on the one or more computer readable storage media. The program instructions are executable to: perform data normalization of a relational database, thereby producing a number of tables of the relational database; calculate an overall sensitivity score for each of the tables of the relational database; determine whether the sensitivity score for each of the tables of the relational database meets or exceeds a table splitting threshold; split, column-wise, any table of the relational database determined to have a sensitivity score that meets or exceeds the table splitting threshold into two tables, each of the two tables including a primary key from the table being split, thereby generating a total number of relational database tables; calculate an overall sensitivity score for each of the total number of relational database tables; divide the total number of relational database tables into a first subset of the total number of relational database tables and a second subset of the total number of relational database tables based on the overall sensitivity scores of each of the total number of relational database tables; store the first subset of the total number of relational database tables in a private cloud storage database; and store the second subset of the total number of relational database tables in a public cloud storage database, wherein the tables of the first subset of the total number of relational database tables have a higher overall sensitivity score than the tables of the second subset of the total number of relational database tables.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 6 depicts an exemplary use scenario wherein tables are split based on sensitivity scores.

DETAILED DESCRIPTION

Figure 1:
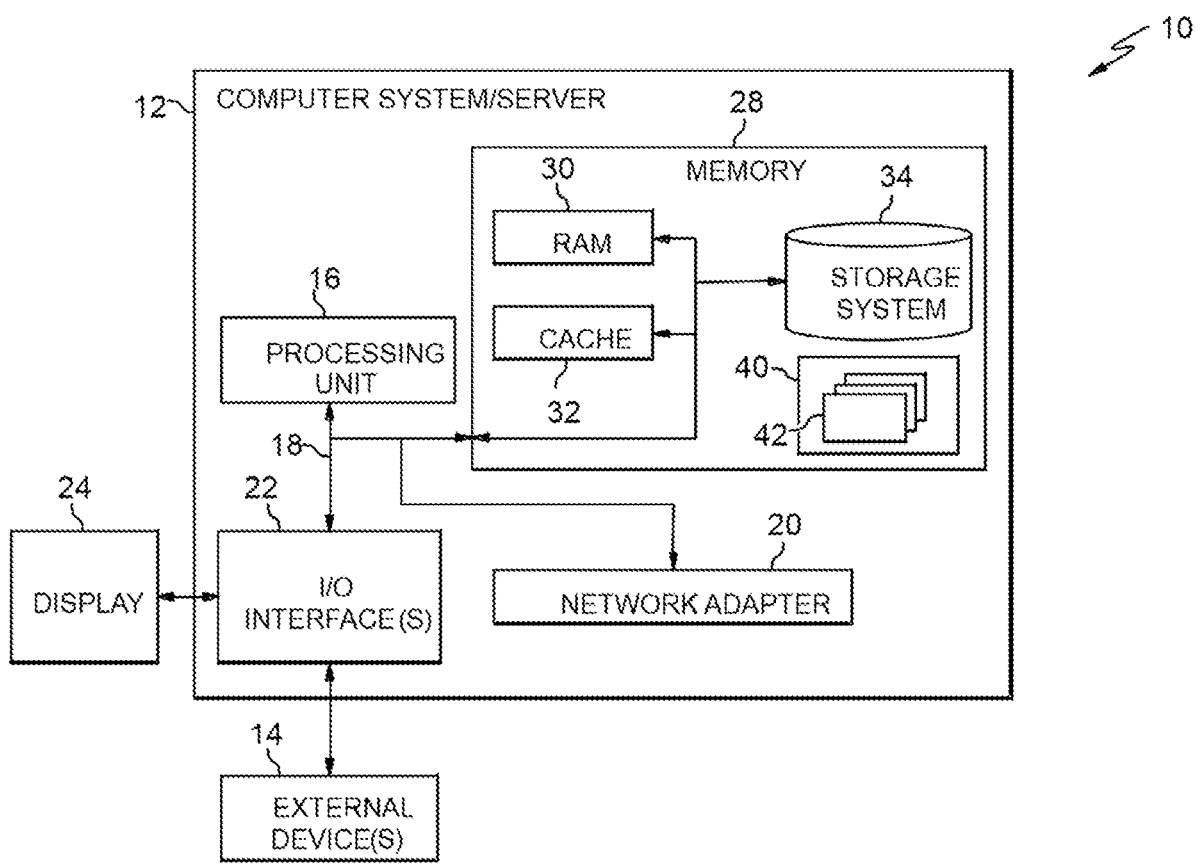
FIG. 1 depicts a cloud computing node according to an embodiment of the present invention.

Aspects of the present invention relate generally to distributed data storage and, more particularly, to sensitivity-based database processing and distributed storage. In embodiments, a system and method is provided for relation data distribution and querying in a hybrid cloud environment by: a) taking attribute sensitivity into account while normalizing a relational database column-wise, and b) querying a database where data is normalized and stored in a distributed manner with respect to sensitivity of table columns.

Presently, separation of data for an organization across public and private cloud resources is performed at a high level. Consider, for example, the following scenario. An insurance company keeps relational data for its customers and policies. A standard practice is to normalize the data using common normal forms (e.g., 1NF, 2NF, 3NF or 4NF) when the database is first created or when there is a change to the table schema (i.e., a change in how the database is organized or constructed). The insurance company may decide that all customer related data should stay in a private cloud while their public information (e.g., policy details, documents required, etc.) may go to a public cloud. However, there is currently no system for splitting data in a relational database such that all sensitive attributes and non-sensitive attributes are separated out into separate tables. Further, there is no current system for querying a database where data is normalized and stored in a distributed manner with respect to sensitive columns while replicating a primary key.

Embodiments of the invention address the technical problem of accurately storing sensitive and non-sensitive data in a hybrid cloud distributed storage network by providing a technical solution including the assignment of sensitivity scores and iterative normalization/splitting of relational database tables to meet sensitivity threshold values before distributing the tables between private and public cloud resources. The technical problem of distributing data between private and public cloud resources is a problem that arises solely in computer network environments.

It should be understood that, to the extent implementations of the invention collect, store, or employ personal information provided by, or obtained from, individuals (for example, name, age, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
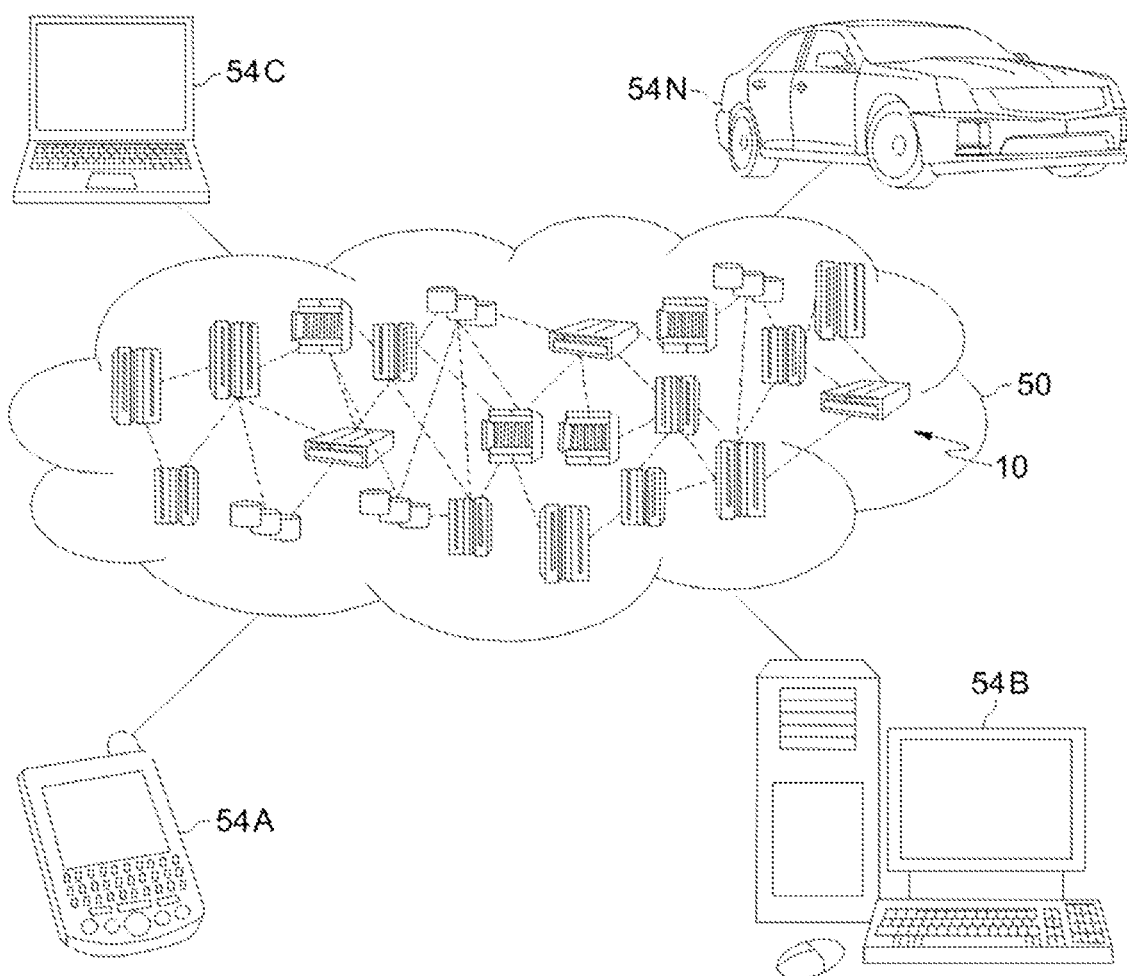
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
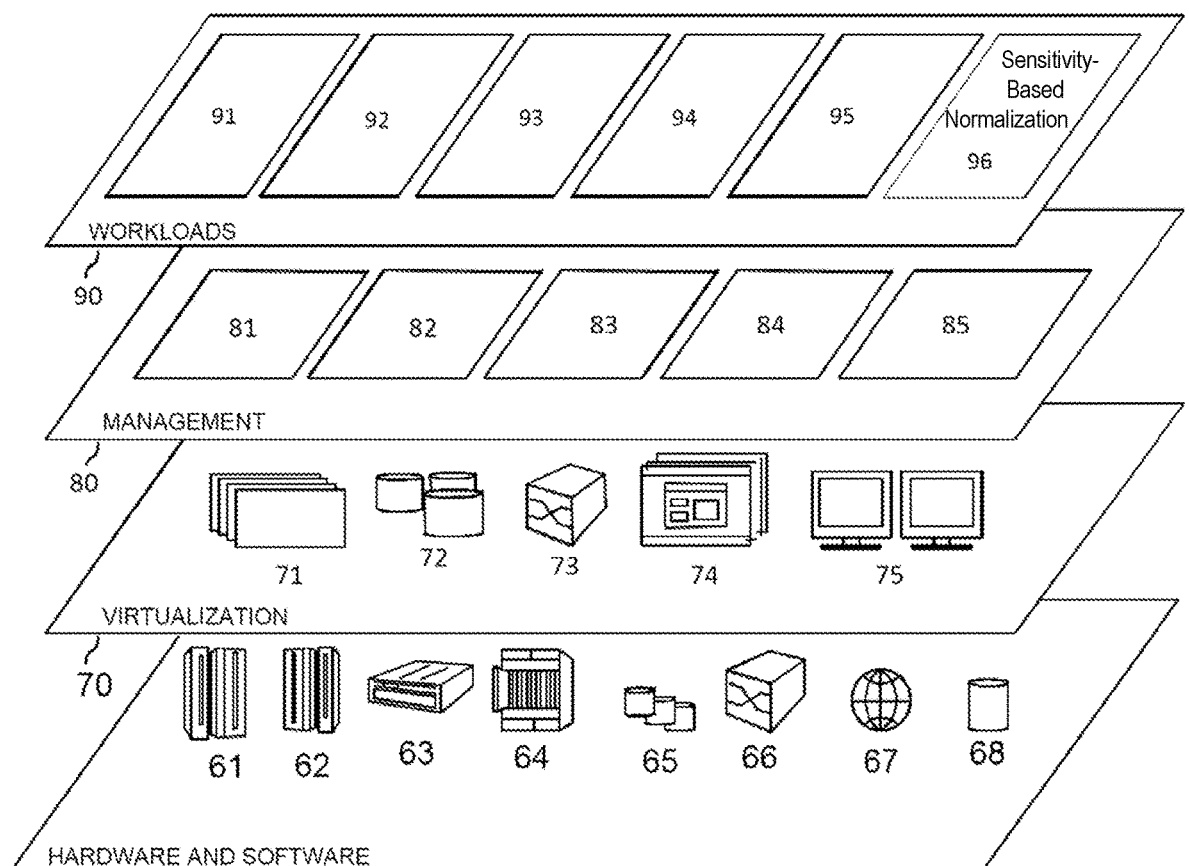
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and sensitivity-based normalization 96.

Implementations of the invention may include a computer system/server 12 of FIG. 1 in which one or more of the program modules 42 are configured to perform (or cause the computer system/server 12 to perform) one of more functions of the sensitivity-based normalization 96 of FIG. 3. For example, the one or more of the program modules 42 may be configured to: normalize a relational database to produce multiple tables; calculate an overall sensitivity score for each of the tables; splitting any table whose overall sensitivity score exceeds a table splitting threshold, wherein each resulting table includes a primary key; separating the tables into a first group having higher sensitivity scores and a second group having lower sensitivity scores; iteratively repeating the calculating the overall sensitivity scores and table splitting until a mean sensitivity score of the first group is greater than a first data processing threshold and the mean sensitivity score of the second group is less than a second data processing threshold; store the first group of tables in a private cloud; store the second group of tables in a public cloud; receive data queries from users; and retrieve data and respond to queries by accessing data on the public cloud and private cloud as needed.

Figure 4:
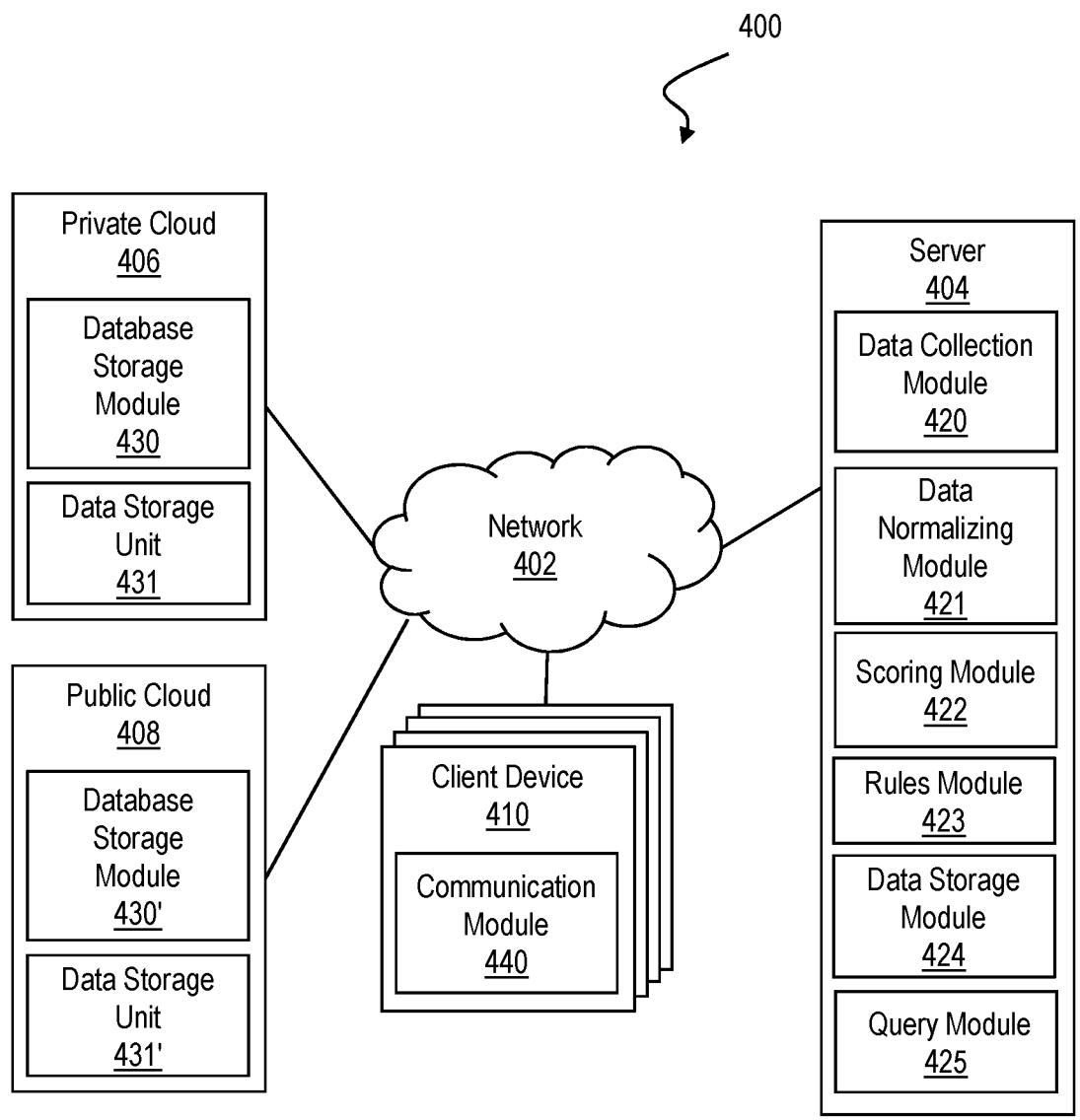
FIG. 4 shows a block diagram of an exemplary environment in accordance with aspects of the invention.

FIG. 4 shows a block diagram of an exemplary distributed data storage environment 400 in accordance with aspects of the invention. In embodiments, the distributed data storage environment 400 includes a network 402 enabling communication between a server 404, a private cloud 406, a public cloud 408, and client devices 410. The term public cloud as used herein refers to an information technology (IT) model where on-demand computing services and infrastructure are managed by a third party provider and shared with the general public using the public Internet. The term private cloud as used herein refers to an IT model where computing services are offered either over the Internet or a private internal network and only to select users instead of the general public. In implementations, the private cloud has more and/or different security features than the public cloud.

The server 404 may comprise the computer system/server 12 of FIG. 1, or elements thereof. The server 404 may be a computing node 10 in the cloud computing environment 50 of FIG. 2. In embodiments, the server 404 comprises one or more modules, each of which may comprise one or more program modules such as program modules 42 described with respect to FIG. 1.

In the example of FIG. 4, the server 404 includes a data collection module 420, a data normalizing module 421, a scoring module 422, a rules module 423, a data storage module 424 and a query module 425. In implementations, the data collection module 420 (comprising program module(s) 42 of FIG. 1, for example) is configured to obtain or access a relational database including multiple data tables. In implementations, each table is a two-dimensional arrangement of data including horizontal rows and vertical columns, wherein each column has a name and contains a particular data type. In embodiments, structured Query Language (SQL) is the database language utilized to access tables of a relational database.

In implementations, the data normalization module 421 (comprising program module(s) 42 of FIG. 1, for example) is configured to normalize relational databases according to normalization rules (e.g., normal forms 1NF, 2NF, 3NF or 4NF). In implementations, normalization is performed on original tables of a relational database and results in the generation of multiple primary tables of the database, wherein data redundancies are reduced by the normalization. In embodiments, the scoring module 422 (comprising program module(s) 42 of FIG. 1, for example) is configured to (after normalization is performed) assign sensitivity scores to table columns, calculate overall sensitivity scores for tables, and selectively and iteratively split tables columnwise based on sensitivity scores.

In embodiments, the rules module 423 (comprising program module(s) 42 of FIG. 1, for example) is configured to store rules for assigning sensitivity scores, and may be accessed by the scoring module 422 during processing of table data. In implementations, the data storage module 424 (comprising program module(s) 42 of FIG. 1, for example) is configured to selectively store tables of a relational database in both a public cloud and a private cloud depending on sensitivity scores determined by the scoring module 422. In embodiments, the query module 425 (comprising program module(s) 42 of FIG. 1, for example) is configured to receive queries from users, forward queries to public and private cloud environments, obtain results from both the public and private cloud environments, and return query results to the user based on the results from both the public and private cloud environments.

The private cloud 406 comprises one or more servers (e.g., the computer system/server 12 of FIG. 1, or elements thereof), and may include data storage resources such as the database storage module 430 configured to store data in one or more data storage units 431. The database storage module 430 may comprise one or more program modules such as program modules 42 described with respect to FIG. 1. The private cloud 406 may comprises a plurality of computing nodes 10 in the cloud computing environment 50 of FIG. 2. In implementations, the private cloud 406 comprises resources of a company. In other implementations, the private cloud 406 is a third party cloud selectively providing services to authorized users.

The public cloud 408 comprises one or more servers (e.g., the computer system/server 12 of FIG. 1, or elements thereof), and may include data storage resources such as the database storage module 430' configured to store data in one or more data storage units 431'. The database storage module 430' may comprise one or more program modules such as program modules 42 described with respect to FIG. 1. The public cloud 408 may comprises a plurality of computing nodes 10 in the cloud computing environment 50 of FIG. 2. In implementations, the public cloud 408 comprises resources of a third party which are accessible by the public via the Internet.

The client devices 410 may comprise computing devices (e.g., the computer system/server 12 of FIG. 1, or elements thereof) in a networked environment. In implementations, the client devices 410 comprise personal computing devices (e.g., 54A, 54B, 54C, etc.) in the cloud computing environment 50 of FIG. 2. The client devices 410 may comprise one or more program modules such as program modules 42 described with respect to FIG. 1. In implementations, the client devices 410 include a communication module 440 (e.g., including program modules 42 described with respect to FIG. 1.) enabling a user to send database queries to the server 404 and receive query results from the server 404.

The server 404, private cloud 406, public cloud 408 and client devices 410 may each include additional or fewer modules than those shown in FIG. 4. In embodiments, for each of the server 404, private cloud 406, public cloud 408 and client devices 410, separate modules may be integrated into a single module. Additionally, or alternatively, a single module may be implemented as multiple modules. Moreover, the quantity of devices and/or networks in the distributed data storage environment 400 is not limited to what is shown in FIG. 4. In practice, the distributed data storage environment 400 may include additional devices and/or networks; fewer devices and/or networks; different devices and/or networks; or differently arranged devices and/or networks than illustrated in FIG. 4.

Figure 5A:
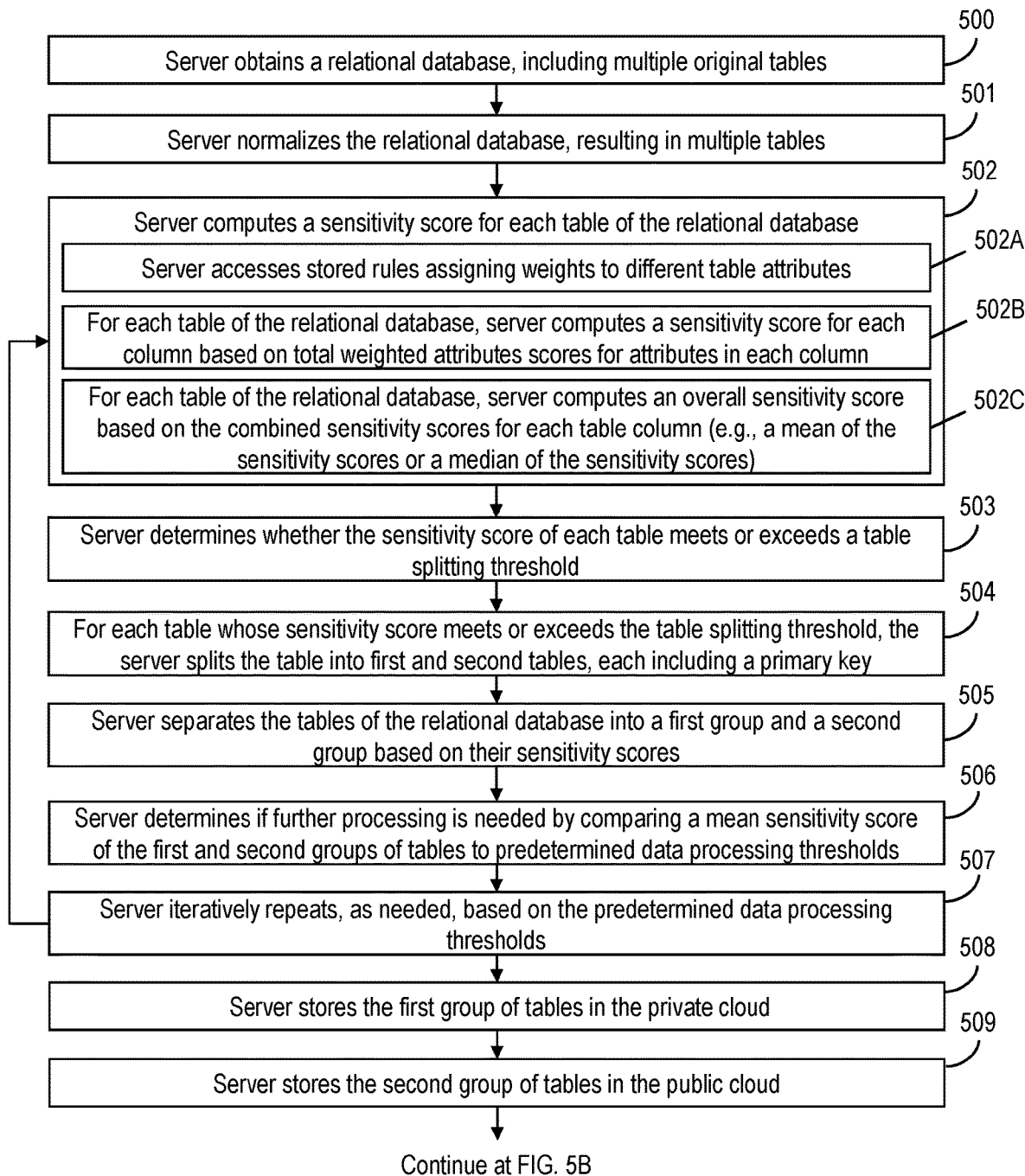
FIGS. 5A and 5B show a flowchart of an exemplary method in accordance with aspects of the invention.
Figure 5B:
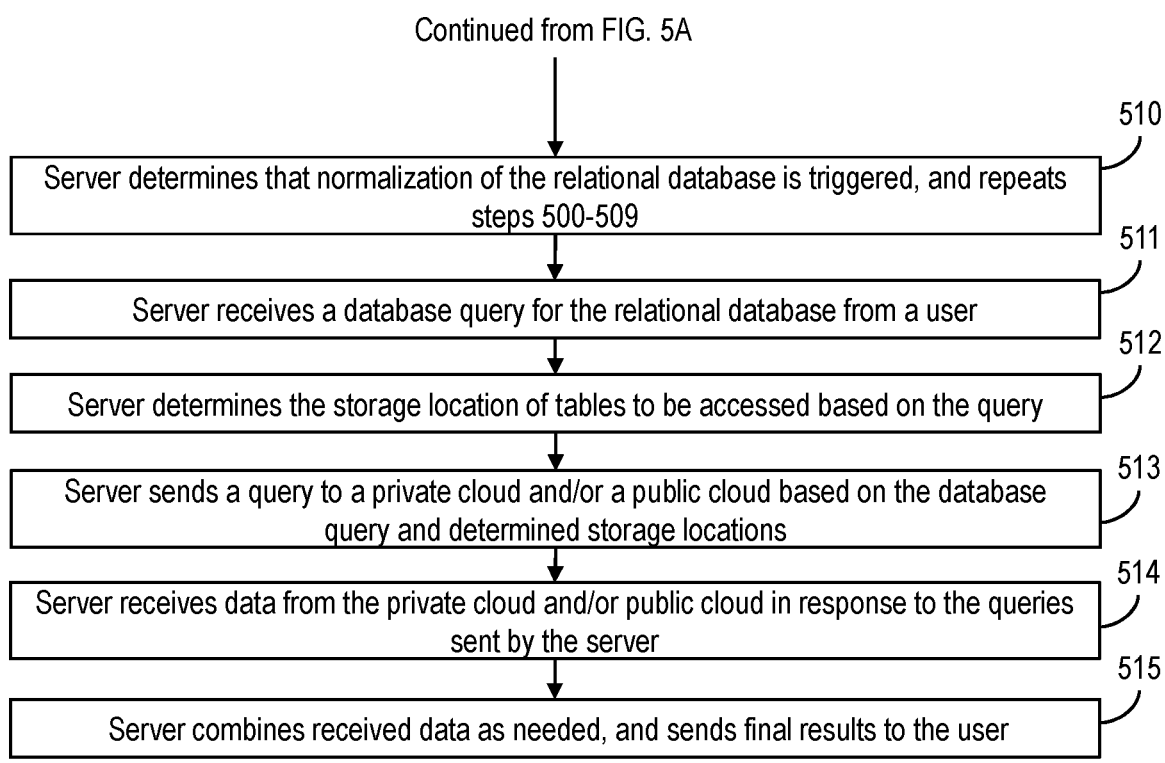

FIGS. 5A and 5B show a flowchart of an exemplary method in accordance with aspects of the invention. Steps of the method may be carried out in the environment of FIG. 4 and are described with reference to elements depicted in FIG. 4.

With initial reference to FIG. 5A, at step 500, the server 404 obtains a relational database, including multiple tables. The server 404 may obtain the relational database from one of the client devices 410, the private cloud 406 and/or the public cloud 408, for example, or may generate the relational database. In embodiments, the data collection module 420 of the server 404 implements step 500.

At step 501, the server 404 normalizes the relational database to produce multiple primary tables from original tables of the relational database. Various normalization methods may be implemented by the server 404, and the invention is not intended to be limited to particular methods of normalizing relational databases. In embodiments, normalization of the database results in the server 404 splitting one or more original database tables into multiple primary tables according to normalization rules (e.g., using normal forms 1NF, 2NF, 3NF, BCNF and 4NF). As used herein the term normalizing refers to a database design technique that reduces data redundancy and eliminates undesirable characteristics like Insertion, Update and Deletion anomalies. Normalization rules may divide tables into smaller tables and link them using relationships. In implementations, the server 404 normalizes the relational database in SQL to eliminate redundant (repetitive) data and ensure data is stored logically. In aspects, step 501 is implemented on a new relational database that has been created and not yet normalized. Alternatively, step 501 may occur to normalize a relational database that has been updated or altered, such as when data schema of the relational database has been changed. In embodiments, the data normalization module 421 of the server 404 implements step 501.

At step 502, the server 404 computes a sensitivity score for each of the primary tables of the relational database obtained after the normalization at step 501. In embodiments, the scoring module 422 implements step 502 based on rules from the rules module 423. In implementations, the sensitivity score for each table is computed based on the following substeps 502A-502C.

At substep 502A, the server 404 accesses stored rules in the rules module 423, including weights assigned to different attributes or attribute types/categories. In implementations, attributes comprise the title or name of a table column, or the type of information or category of information associated with the table column. In one example, a relational database for an insurance company may include tables with the following attributes: customer ID, name, age, date of birth, location of birth, father's name, address, existing medical condition, term plan, duration, medical condition covered, education, profession, etc. In this example, different weights may be assigned to different attributes based on the level of sensitivity associated with the respective attributes. For example, a customer's name, age and date of birth would be weighted relatively higher than other attributes (e.g., the term plan, education and profession), based the private or sensitive nature of this type of data.

At substep 502B, the server 404 computes, for each table, a sensitivity score for each column in the table based on all weighted attribute scores. In implementations, a user may manually assign sensitivity scores for each column of a table. In other implementations, the server 404 automatically assigns the sensitivity scores for each column in a table based on the stored rules in the rules module 423. In embodiments, rules module 423 may learn and/or update rules over time, such as weights to assign to respective attributes and/or attributes types, based on feedback received (e.g., manual corrections to sensitivity scores or attribute weights, etc.).

At substep 502C, the server 404 computes, for each table of the relational database, an overall sensitivity score based on the combined sensitivity scores for each of the table's columns. For example, a table including the attributes "ID", "name", "age", "date of birth", and "location of birth", would have an overall sensitivity score based on weighted scores for each of those five attributes. In implementations, the overall sensitivity score for a table comprises a mean or median of the sensitivity scores of the table's columns.

At step 503, the server 404 determines whether the sensitivity score of each table of the relational database meets or exceeds a predetermined table splitting threshold. In embodiments, the scoring module 422 implements step 503 based on a table splitting threshold from the rules module 423.

At step 504, for each table (e.g., primary table) of the relational database that meets or exceeds the predetermined table splitting threshold at step 503, the server 404 performs column-wise splitting of the table into two tables (e.g., first and second secondary tables), each of which includes a primary key from the table being split. The term primary key as used herein refers to a column or a set of columns in a table whose values uniquely identify a row in a table. In implementations, the server 404 splits each table at step 504 according to the sensitivity scores of the table columns, such that one of the resultant tables (e.g., the first secondary table) has a higher sensitivity score than the other one of the resulting tables (e.g., the second secondary table). In embodiments, the scoring module 422 implements step 504.

At step 505, the server 404 separates all the tables (e.g., primary, secondary, tertiary, etc.) of the relational database into a first group of tables having relatively higher sensitivity scores (relative to all tables in the relational database or a threshold value) and a second group of tables having lower sensitivity scores (relative to all tables in the relational database or a threshold value) according to predetermined rules. The server 404 may group tables of the relational database based on which tables have sensitivity scores meeting a predetermined sensitivity threshold (Group I) and which tables have sensitivity score that do not meet the predetermined sensitivity threshold (Group II), or may divide the tables into groups by putting the tables with the highest sensitivity score relative to the group of tables in Group I, while putting tables with the lowest sensitivity score relative to the group of tables in Group II. It should be understood that server 404 may group tables having a median sensitivity score in either the first group of tables or the second group of tables, according to predetermined rules. In general, the purpose of step 505 is to group tables having the most sensitive data, as indicated by the sensitivity score, in a first group, and group tables having the least sensitive data, as indicated by the sensitivity score, in a second group. In embodiments, the scoring module 422 implements step 505.

At step 506, the server 404 determines if further data processing (table splitting) is needed by comparing a mean sensitivity score of the first group of tables from step 505 to a first predetermined data processing threshold (e.g., threshold A), and comparing a mean sensitivity score of the second group of tables from step 505 to a second predetermined data processing threshold (e.g., threshold B). In implementations, if the mean sensitivity score of the first group of tables (higher sensitivity tables) is less than the first predetermined data processing threshold, then the server 404 determines that further data processing (table splitting) is required. Likewise, if the mean sensitivity score of the second group of tables (low sensitively tables) meets or exceeds the second predetermined data processing threshold, the server 404 determines that further data processing (table splitting) is required. In other words: if a mean sensitivity score of Group I≤threshold A=perform further processing; and if a mean sensitivity score of Group II≥threshold B=perform further processing. In this example, further processing (table splitting) ends when a mean sensitivity score of Group I>threshold A; and a mean sensitivity score of Group II<threshold B. In embodiments, the scoring module 422 of the server 404 implements step 506.

At step 507, the server 404 repeats, as needed, steps 502-506 based on the determination at step 506 that at least one of the first group of tables or second group of tables requires further processing/table splitting. In embodiments, step 507 is repeated until the server determines at step 506 that a mean sensitivity score of Group I>threshold A; and a mean sensitivity score of Group II<threshold B. In this way, the server 404 may divide primary tables into second tables, secondary tables into tertiary tables, etc., until the server 404 determines that no further processing is required. In embodiments, the scoring module 422 initiates further data processing, as needed, according to step 507.

Once further data processing is no longer needed according to steps 506-507, at step 508, the server 404 stores the first group of tables (e.g., having the highest sensitivity scores) in a private cloud environment (e.g., private cloud 406 of FIG. 4). In implementations, the private cloud environment is a private cloud 406 of a company for whom the relational database was generated (e.g., owner of the relational database). In implementations, the server 404 records storage information regarding the storage location of the first group of tables in a lookup table or dictionary. In this way, the most sensitive data of the relational database may be stored in a secure setting (i.e., a secure private cloud 406) having limited access. In embodiments, the data storage module 424 implements step 508.

At step 509, the server 404 stores the second group of tables (e.g., having the lowest sensitivity scores) in a public cloud environment (e.g., public cloud 408 of FIG. 4). In implementations, the public cloud environment is a public cloud 408 of a third party providing storage services for paying members of the public. In implementations, the server 404 records storage information regarding the storage location of the second group of tables in a lookup table or dictionary. In this way, the owners of the relational database can leverage the scale and flexibility of public cloud storage for the least sensitive data of the relational database. In embodiments, the data storage module 424 implements step 509.

Turning to FIG. 5B, at step 510, the server 404 determines that normalization of the relational database has been triggered and repeats steps 500-509. In implementations, the sever 404 determines that normalization of the relational database has been triggered when the server 404 determines that new schema has been introduced into the relational database. In embodiments, the data normalizing module 421 implements step 510.

At step 511, the server 404 receives a query regarding the relational database from a user (e.g., from a remote user via client device 410 of FIG. 4). In implementations, the communication module 440 of a client device 410 sends a database query to the query module 425 of the server 404 (e.g., via a graphical user interface). The database query may be in the form of an SQL query, for example.

At step 512, the server 404 determines the storage location of tables of the relational database to be accessed based on the query received at step 511. In implementations, the server 404 determines which table columns need to be accessed based on the query, and looks up the storage location of the tables including those table columns in a lookup table or dictionary. In embodiments, the data storage module 424 of the server 404 implements step 512.

At step 513, the server 404 sends a query to a private cloud storage environment (e.g., private cloud 406 of FIG. 4) and/or public cloud storage environment (e.g., public cloud 408 of FIG. 4) based on the query received at step 511 and the storage location determined at step 512. In implementation, the server 404 processes the original query received at step 511, configures the query as needed, sends a first query to the private cloud 406 based on the original query, and sends a second query to the public cloud 408 based on the original query. In this way, a database query received by the server 404 which requires access to resources stored on both a private cloud 406 and a public cloud 408 may be forwarded to the appropriate cloud environments by the server 404 as necessary to obtain the tables required by the database query. In embodiments, the query module 425 of the server 404 implements step 513.

At step 514, the server 404 receives data (e.g., one or more tables of the relational database) from the private cloud storage environment (e.g., private cloud 406 of FIG. 4) and/or public cloud storage environment (e.g., public cloud 408 of FIG. 4) in response to the query or queries sent at step 513. In embodiments, the query module 425 implements step 514.

At step 515, the server 404 combines data received at step 514 as needed, and sends the data (i.e., final results) to the user in response to the database query received at step 511. In one example, the server 404 combines one or more database tables received from the private cloud 406 and one or more database tables received from the public cloud 408, and forwards the final results to a user's client device 410 in response to a database query received from the user. In embodiments, the query module 425 of the server 404 implements step 515.

FIG. 6 depicts an exemplary use scenario wherein tables are split based on sensitivity scores. Steps depicted in FIG. 6 correspond to method steps of FIGS. 5A and 5B. In the example of FIG. 6, an original table 600 of a relational database for an insurance company is shown. The original table includes the following attributes: ID, Name, Age, Data of Birth, Location of birth, Address, Medical Info, profession, Education, Term plan and Duration. In the example of FIG. 6, the attributes comprise column headings of a relational database table 600. In accordance with step 501 of FIG. 5A, the server 404 normalizes the original table 600 at 601, and in the course of normalizing the original table 600, creates primary tables 602A, 602B and 602C, each of which includes a primary key "ID". The server 404 assigns sensitivity scores to the primary tables 602A-602C according to step 502 of FIG. 5A, and determines whether the sensitivity scores of each of the primary tables 602A-602C meets or exceeds a predetermined table splitting threshold value according to step 503 of FIG. 5A.

In the scenario of FIG. 6, primary tables 602B and 602C have sensitivity scores that are less than the table splitting threshold, and therefore do not require further splitting. In contrast, the primary table 602A has a sensitivity score that is greater than or equal to the table splitting threshold, and is therefore split (column-wise) by the server 404 at step 604 into secondary table 603A and secondary table 603B (in accordance with step 504 of FIG. 5A), wherein the secondary tables 603A and 603B both include the primary key "ID".

In accordance with steps 505 and 506 of FIG. 5A, the server 404 groups all tables into a first group and a second group, compares the mean sensitivity score from the groups to the first and second data processing thresholds, and determines that no further data processing is required. In the example of FIG. 6, secondary tables 603A and 603b are in the first group (highest sensitivity scores) and are stored in a private cloud (e.g., private cloud 406) at 605 (in accordance with step 508 of FIG. 5A), while the primary tables 602B and 602C are in the second group (lowest sensitivity scores) and are stored in a public cloud (e.g., public cloud 408) at 606 (in accordance with step 509 of FIG. 5A). In the example of FIG. 6, all stored tables include the primary key "ID".

In one exemplary scenario, the server 404 receives a query from an insurance company who owns the relational database of FIG. 6. In this example, the insurance company requests the names of all customers who reside in a particular geographic area with the query "Get names of all the customers who reside in area A". In this scenario, the server 404 breaks down the query into two parts, a first part which can be executed on the private cloud 406 and a second part that can be executed on the public cloud 408. From the query, the attribute for which the query is conditional (customer IDs) is extracted by the server 404, and all attributes which are required to be reported (customers in area A, names of customers) are also extracted. In this example, the server 404 determines the storage location where the conditional attribute (i.e., customer IDs) is stored based on stored meta data (e.g., from a lookup table). In this example, the query is decomposed into two parts: part 1) "Get all the customer IDs residing in area A"; and part 2) "Get names of the customers for the customer IDs." The server 404 executes the query of part 1 in the public cloud 408 and execute the query of part 2 in the private cloud 406, wherein the customer IDs from the results of the query of part 1 are used to execute the query of part 2 on the private cloud 406.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    calculating, by a computing device in a distributed storage environment, an overall data sensitivity score, for each table of a relational database based on predefined attribute rules, which indicates a level of sensitivity of data in the table, wherein the overall data sensitivity score for each table is based on individual data sensitivity scores assigned to each column of the table;
    performing, by the computing device, column-wise splitting of at least one of the tables of the relational database to create a first table having a portion of columns of the at least one of the tables of the relational database and a second table having another portion of the columns of the at least one of the tables of the relational database based on an overall data sensitivity score of the at least one of the tables of the relational database, thereby generating a total number of relational database tables;
    storing, by the computing device, a first subset of the total number of relational database tables in a private cloud storage database in the distributed storage environment based on the overall data sensitivity scores of each of the total number of relational database tables; and
    storing, by the computing device, a second subset of the total number of relational database tables in a public cloud storage database of the distributed storage environment based on the overall data sensitivity scores of each of the total number of relational database tables.

2. The method of claim 1, further comprising dividing, by the computing device, the total number of relational database tables into the first subset of the total number of relational database tables and the second subset of the total number of relational database tables, wherein the first subset comprises tables having a higher overall sensitivity score than the tables of the second subset.

3. The method of claim 2, further comprising: performing, by the computing device, the column-wise splitting of at least one of the tables of the relational database iteratively until a mean sensitivity score of the first subset of tables is greater than a first predetermined data processing threshold and a mean sensitivity score of the second subset of tables is less than a second predetermined data processing threshold.

4. The method of claim 1, wherein the calculating an overall data sensitivity score for each table of the relational database comprises: assigning, by the computing device, the individual data sensitivity scores to each column of each table of the relational database, wherein the overall data sensitivity score for each table is computed from the individual data sensitivity scores of the table's columns.

5. The method of claim 4, wherein the overall data sensitivity score for each table is computed as a mean or a median of the individual data sensitivity scores of the table's columns.

6. The method of claim 4, wherein the attribute rules assign different attribute weights to different attributes, and wherein the assigning the individual data sensitivity score to each column of each table of the relational database is based on the attribute weights.

7. The method of claim 1, further comprising:
    receiving, by the computing device, a query from a user;
    determining, by the computing device, one or more stored tables of the relational database to access based on the query;
    determining, by the computing device, a storage location of each of the one or more stored tables to access;
    sending, by the computing device, a first query to the private cloud based on the query from the user and the determining the storage location of each of the one or more stored tables to access;
    sending, by the computing device, a second query to the public cloud based on the query from the user and the determining the storage location of each of the one or more stored tables to access;
    combining, by the computing device, query results received from the private cloud with query results received from the public cloud, thereby creating final query results; and
    sending, by the computing device, the final query results to the user.

8. The method of claim 1, wherein the computing device includes software provided as a service in a cloud environment.

9. A computer program product comprising one or more computer readable storage media having program instructions collectively stored on the one or more computer readable storage media, the program instructions executable to:
    perform data normalization of a relational database, thereby producing a number of tables of the relational database;
    calculate an overall sensitivity score for each of the tables of the relational database based on predefined attribute rules, which indicates a level of sensitivity of data in the table, wherein the overall data sensitivity score for each table is based on individual data sensitivity scores assigned to each column of the table;
    determine whether the sensitivity score for each of the tables of the relational database meets or exceeds a table splitting threshold;
    perform column-wise splitting any table of the relational database determined to have a sensitivity score that meets or exceeds the table splitting threshold to create a first table having a portion of columns of the at least one of the tables of the relational database and a second table having another portion of the columns of the at least one of the tables of the relational database based on an overall data sensitivity score of the at least one of the tables of the relational database, wherein the first table and the second table each include a primary key from the table being split, thereby generating a total number of relational database tables;
    store a first subset of the total number of relational database tables in a private cloud storage database based on the overall data sensitivity scores of each of the total number of relational database tables; and store a second subset of the total number of relational database tables in a public cloud storage database based on the overall data sensitivity scores of each of the total number of relational database tables, wherein the tables of the first subset of the total number of relational database tables have a higher overall sensitivity score than the tables of the second subset of the total number of relational database tables.

10. The computer program product of claim 9, wherein the program instructions are further executable to:
calculate an overall sensitivity score for each of the first table and the second table; and
divide the total number of relational database tables into the first subset of the total number of relational database tables and the second subset of the total number of relational database tables based on the overall sensitivity scores of each of the total number of relational database tables.

11. The computer program product of claim 10, wherein the program instructions are further executable to: perform the column-wise splitting of at least one of the tables of the relational database, and the calculating an overall sensitivity score for each of the tables of the relational database, iteratively until a mean sensitivity score of the first subset of tables is greater than a first predetermined data processing threshold and a mean sensitivity score of the second subset of tables is less than a second predetermined data processing threshold.

12. The computer program product of claim 9, wherein the calculating an overall sensitivity score for each of the tables of the relational database comprises: assigning the individual data sensitivity scores to each column of each table of the relational database, wherein the overall data sensitivity score for each table is computed from the individual data sensitivity scores of the table's columns.

13. The computer program product of claim 12, wherein the overall data sensitivity score for each table is computed as a mean or a median of the individual data sensitivity scores of the table's columns.

14. The computer program product of claim 12, wherein the attribute rules assign different attribute weights to different attributes, and wherein the assigning the individual data sensitivity score to each column of each table of the relational database is based on the attribute weights.

15. The computer program product of claim 9, wherein the program instructions are further executable to:
receive a query from a user;
determine one or more stored tables of the relational database to access based on the query;
determine a storage location of each of the one or more stored tables to access;
send a first query to the private cloud based on the query from the user and the determining the storage location of each of the one or more stored tables to access;
send a second query to the public cloud based on the query from the user and the determining the storage location of each of the one or more stored tables to access;
combine query results received from the private cloud with query results received from the public cloud, thereby creating final query results; and
send the final query results to the user.

16. A system comprising:
a processor, a computer readable memory, one or more computer readable storage media, and program instructions collectively stored on the one or more computer readable storage media, the program instructions executable to:
perform data normalization of a relational database, thereby producing a number of tables of the relational database;
calculate an overall sensitivity score for each of the tables of the relational database which indicates a level of sensitivity of data in the table, wherein the overall data sensitivity score for each table is based on individual data sensitivity scores assigned to each column of the table;
determine whether the sensitivity score for each of the tables of the relational database meets or exceeds a table splitting threshold;
perform column-wise splitting of any table of the relational database determined to have a sensitivity score that meets or exceeds the table splitting threshold to create a first table having a portion of columns of the at least one of the tables of the relational database and a second table having another portion of the columns of the at least one of the tables of the relational database based on an overall sensitivity score of the table being split, each of the first table and the second table including a primary key from the table being split, thereby generating a total number of relational database tables;
calculate an overall sensitivity score for each of the total number of relational database tables;
divide the total number of relational database tables into a first subset of the total number of relational database tables and a second subset of the total number of relational database tables based on the overall sensitivity scores of each of the total number of relational database tables;
store the first subset of the total number of relational database tables in a private cloud storage database; and
store the second subset of the total number of relational database tables in a public cloud storage database, wherein the tables of the first subset of the total number of relational database tables have a higher overall sensitivity score than the tables of the second subset of the total number of relational database tables.

17. The system of claim 16, wherein the program instructions are further executable to: perform the column-wise splitting of at least one of the tables of the relational database, and the calculating an overall sensitivity score for each of the tables of the relational database, iteratively until a mean sensitivity score of the first subset of tables is greater than a first predetermined data processing threshold and a mean sensitivity score of the second subset of tables is less than a second predetermined data processing threshold.

18. The system of claim 16, wherein the calculating an overall sensitivity score for each of the tables of the relational database comprises: assigning the individual data sensitivity scores to each column of each table of the relational database, wherein the overall data sensitivity score for each table is computed as a mean or a median of the individual data sensitivity scores of the table's columns.

19. The system of claim 18, wherein the attribute rules assign different attribute weights to different attributes, and wherein the assigning the individual data sensitivity score to each column of each table of the relational database is based on the attribute weights.

20. The system of claim 16, wherein the program instructions are further executable to:
- receive a query from a user;
- determine one or more stored tables of the relational database to access based on the query;
- determine a storage location of each of the one or more stored tables to access;
- send a first query to the private cloud based on the query from the user and the determining the storage location of each of the one or more stored tables to access;
- send a second query to the public cloud based on the query from the user and the determining the storage location of each of the one or more stored tables to access;
- combine query results received from the private cloud with query results received from the public cloud, thereby creating final query results; and
- send the final query results to the user.

* * * * *